Feb. 9, 1937.  J. MOCHARNUK  2,070,214
CUSHIONING UNIT FOR VEHICLE TIRES
Filed Feb. 15, 1936  2 Sheets-Sheet 1

Inventor
John Mocharnuk

By Clarence A. O'Brien and
Hyman Berman
Attorneys

Feb. 9, 1937.   J. MOCHARNUK   2,070,214
CUSHIONING UNIT FOR VEHICLE TIRES
Filed Feb. 15, 1936   2 Sheets-Sheet 2

Inventor
John Mocharnuk
By Clarence A. O'Brien and
Hyman Berman
Attorneys

Patented Feb. 9, 1937

2,070,214

UNITED STATES PATENT OFFICE 2,070,214

CUSHIONING UNIT FOR VEHICLE TIRES

John Mocharnuk, McCamey, Tex.

Application February 15, 1936, Serial No. 64,152

3 Claims. (Cl. 152—8)

The present invention relates to new and useful improvements in vehicle tires and has for its primary object to provide novel means for yieldingly supporting a casing under load without the use of air, as in the usual inflatable inner tube, thus eliminating the expense and nuisance of flat tires as well as eliminating the danger of blow-outs.

Other objects of the invention are to provide a cushioning unit of the aforementioned character for vehicle tires which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
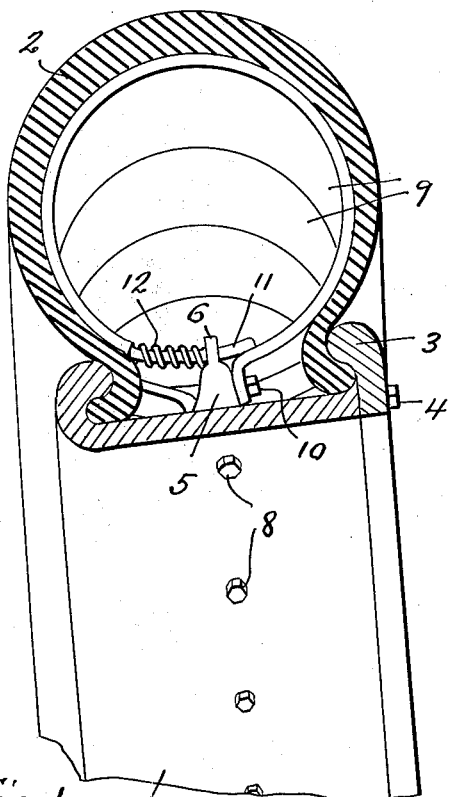
Figure 1 is a cross sectional view in perspective, showing a unit constructed in accordance with the present invention mounted in a casing.
Figure 2:
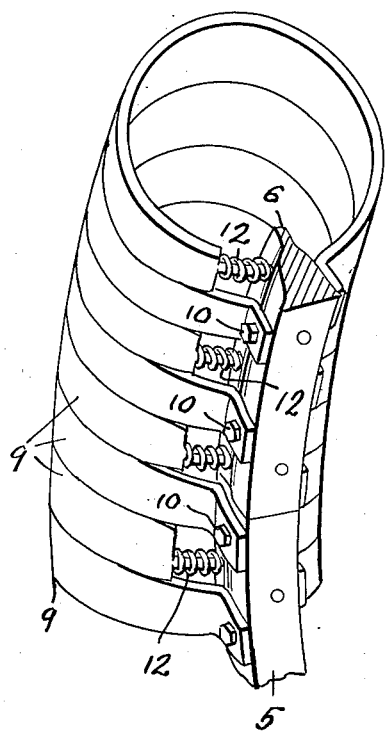
Figure 2 is a perspective view of a portion of the invention.
Figure 3:
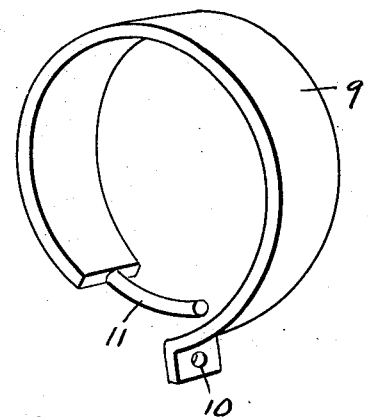
Figure 3 is a detail view in perspective of one of the resilient supporting coils.
Figure 4:
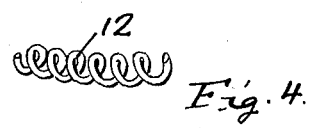
Figure 4 is a detail view of one of the coil springs constituting a part of the invention.
Figure 5:
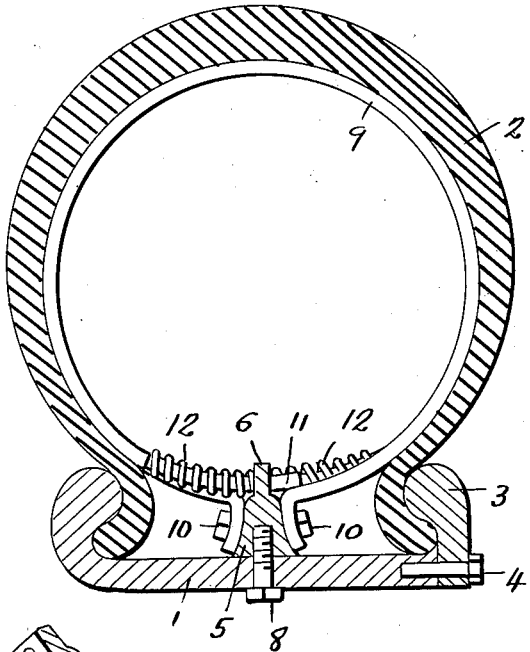
Figure 5 is a view in vertical cross section, showing the invention mounted in a casing.
Figure 7:
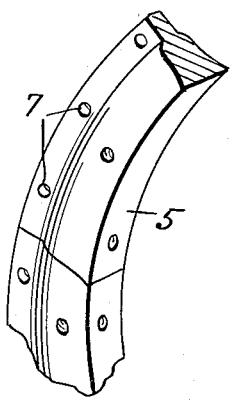
Figure 7 is a fragmentary view in perspective, showing the abutting ends of the anchoring ring.
Figure 6:
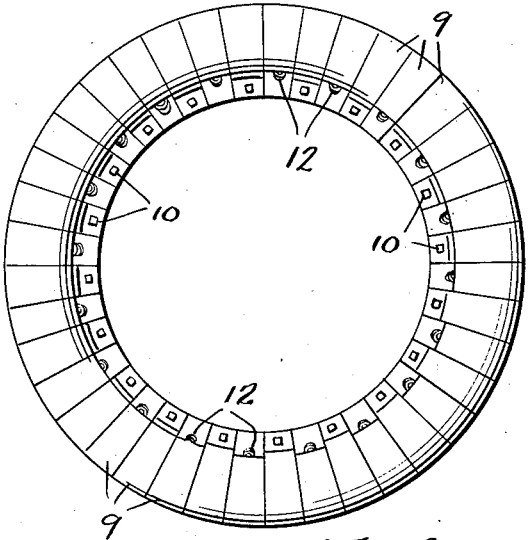
Figure 6 is a view in side elevation of the invention.
Figure 8:
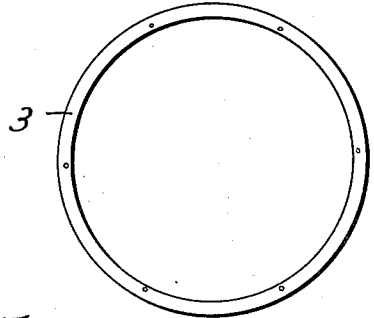
Figure 8 is a detail view in side elevation of the removable side ring constituting a part of the rim on which the tire is mounted.

Referring now to the drawings in detail, it will be seen that the reference numeral 1 designates a rim which carries a casing 2, said rim 1 being provided with a removable side ring 3 which is secured by bolts 4.

Rigidly secured centrally on the rim 1 and encircling said rim is a split anchoring ring 5 which is formed to provide, on its outer periphery, a rib 6 having spaced openings 7 therein. The split anchoring ring 5 is secured to the rim 1 by bolts 8 or other suitable means.

The reference numeral 9 designates resilient coils which are rigidly secured, as at 10, on the sides of the ring 5, said coils being engaged in the casing 2 in a manner to yieldingly support the same. It will be noted that the coils 9 are mounted alternately on opposite sides of the anchoring ring 5 and that said coils are alternately reversed. Projecting from the free ends of the coils 9 are guides 11 which are slidably engaged in the openings 7 of the rib 6. Coil springs 12 encircle the guides 11 between the rib 6 and the free ends of the coils 9.

It is thought that the operation of the invention will be readily apparent from a consideration of the foregoing. As the coils 9 yield under the load the guides 11 slide in the openings 7, the coil springs 12 contracting and expanding as said coils 9 flex. The springs 12 yieldingly urge the coils 9 toward expanded position. It will thus be seen that various loads will be yieldingly supported without the use of air. The tire may be removed for any purpose, such as when the casing 2 is worn out and is to be replaced, by removing the bolts 8 and the side ring 3 of the rim 1.

It is believed that the many advantages of a cushioning unit constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. A yielding core for vehicle tires comprising an anchoring ring, a peripheral rib on said anchoring ring having spaced transverse apertures therein, resilient coils secured, at one end, to the anchoring ring, guides projecting from the free ends of said coils and extending slidably through the apertures, and coil springs mounted on said guides between the rib and the free ends of the coils.

2. A yielding core for vehicle tires comprising an anchoring ring having spaced apertures therein, alternately reversed resilient coils secured, at one end, alternately on opposite sides of said anchoring ring, a peripheral rib on the anchoring ring, guides projecting from the free ends of the apertures in the coils and extending slidably through the rib, and coil springs mounted on said guides between the rib and the free ends of the coils.

3. In combination with a rim and a casing mounted on said rim, an anchoring ring secured centrally on the rim and encircling the same and having a plurality of spaced apertures therein, resilient coils secured, at one end, alternately on opposite sides of the anchoring ring and engaged in the casing, guides on the free ends of the coils slidably extending through the apertures into the anchoring ring, and coil springs mounted between said anchoring ring and the free ends of the coils.

JOHN MOCHARNUK.